United States Patent [19]
White

[11] 3,939,005
[45] Feb. 17, 1976

[54] METHOD FOR AUTOMATIC PREPARATION OF SOLUTIONS OF LIQUID AND DRY MATERIALS

[76] Inventor: Donald R. White, 5218 Howard, Western Springs, Ill. 60558

[22] Filed: July 5, 1974

[21] Appl. No.: 486,017

Related U.S. Application Data

[62] Division of Ser. No. 339,420, March 8, 1973.

[52] U.S. Cl. ............... 127/63; 23/267 R; 23/271 R; 23/272.6 R; 127/22; 423/658.5
[51] Int. Cl.² ........................................... B01F 1/00
[58] Field of Search 127/22, 63; 23/267 R, 272.6 R; 137/389, 391, 268

[56] References Cited
UNITED STATES PATENTS
3,837,914   9/1974   Cadeo .................................. 127/22

Primary Examiner—Morris O. Wolk
Assistant Examiner—Sidney Marantz
Attorney, Agent, or Firm—Hill, Gross, Simpson, Van Santen, Steadman, Chiara & Simpson

[57] ABSTRACT

A method and apparatus for the automatic production, on demand, of solutions of liquid and dry materials, for example, particularly liquid sugar from initial constituents of dry sugar and water, in which a storage supply of solution, such as liquid sugar is available for withdrawl and use, such supply being adapted to be maintained from a mixing station with the bulk materials being supplied in predetermined quantities from a supply station and converted, for example, into liquid sugar by the application of heat, the supply being suitably monitored and replenished and the materials measured and mixed on demand, automatically as required. Other materials may be simultaneously included to form blends etc.

5 Claims, 3 Drawing Figures

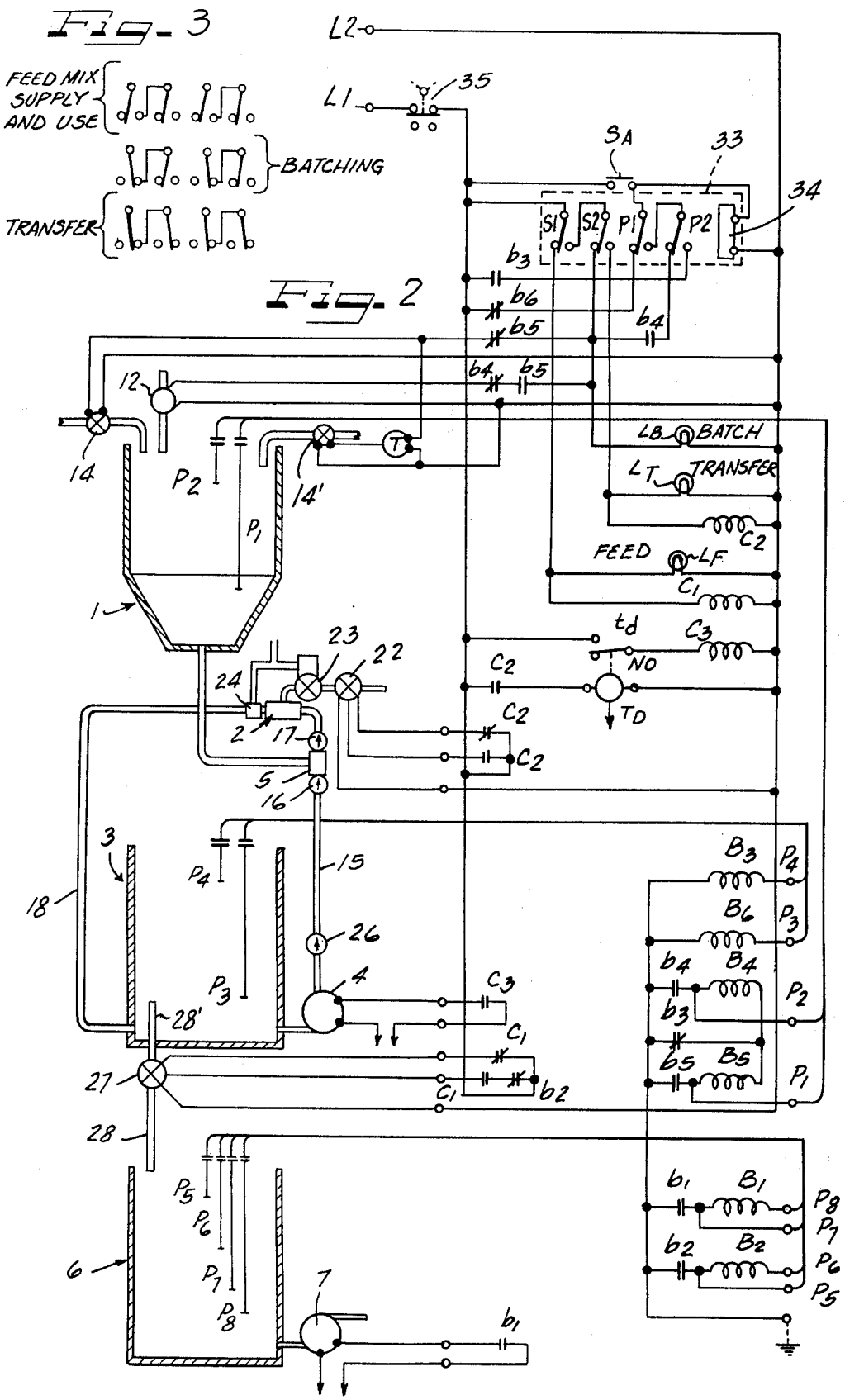

METHOD FOR AUTOMATIC PREPARATION OF SOLUTIONS OF LIQUID AND DRY MATERIALS

This is a division of application Ser. No. 339,420, filed Mar. 8, 1973.

BACKGROUND OF THE INVENTION

The invention is directed to a method and apparatus of solutions of liquids and soluble dry materials, whereby a supply of liquid material is continuously available for utilization in quantities commensurate with the use application.

The present invention has particular application in the food processing industry in connection with the preparation of liquid sugar, and the like, and therefore will be discussed and described in connection with such application. However, it will be appreciated that the invention has application in many fields involving the processing of liquid and dry materials, in which its novel features may be used to advantage.

It will therefore be appreciated that this specific reference to "sugar", "water", "liquid sugar", etc. are merely illustrative; and even in the food processing industry, there are specific representatives of other sweetners and materials involved in food processing.

Most, if not all, food preparations commercially vended contain some quantity of sugar and/or sweetners, and it is therefore necessary to provide supplies of sugar and/or blends sufficient to fill the desired needs.

It will be appreciated, with respect to such application, that where sugar is employed in very small quantities, it may be stored, measured out and utilized in dry form. However, when large commercial quantities are involved, the storage, transportation, measurement and general handling thereof raises various problems in connection with its use in the finished product. It will be appreciated that the handling of dry sugar bags requires manual handling as well as suitable conveyor or transporting equipment, storage space for the bags of sugar at use points and additional labor in connection with the handling of the bags and supply of sugar to the use equipment. In view of such disadvantages, it has been found expedient in many, if not most, cases to employ sugar in the form of a liquid, i.e. sugar and water, which may be readily transported by suitable liquid handling systems and readily measured as to quantity by automatic or semi-automatic equipment. While this type of operation, of necessity, includes some form of storage system, necessitating a relatively large storage system with attendant space loss, as both sugar and water is stored, as compared with merely the storage of dry sugar, the above referred advantages have in most cases rendered its use desirable.

In the handling of liquid sugar, where the amount utilized is comparatively small, the manufacturer may provide merely adequate tankage to accommodate his normal use requirements, with his sugar being received in liquid form by tank truck and pumped directly into the storage tank system. It will be appreciated that as the amount of sugar utilized increases, the storage requirements likewise must proportionately increase to accommodate the additional volume, as well as accommodate sufficient sugar to span periods between deliveries.

Where the manufacturer utilizes sugar in sufficiently large quantities, it may be considered advantageous to install a complete conversion system for converting the dry sugar into liquid form thereby eliminating the additional handing by tank truck, etc. as well as eliminating additional storage facilities required by periodic deliveries.

Where the manufacturer has installed his own plant, batches of liquid sugar are processed in substantially the same manner as at remote conversion plants whereby merely the transportation of liquid sugar is saved, as in this case adequate storage tank capacity still must be provided as well as space for the equipment and dry sugar.

BRIEF SUMMARY OF THE INVENTION

The present invention is directed to a method and apparatus for effecting mixing operations with liquids, or liquid and dry ingredients, to form desired liquid solutions and the like, for example, in the food processing industry, liquid sugar.

The invention, in this example thus enables storage of merely the dry sugar and automatic conversion to liquid sugar substantially commensurate with the demand.

The present invention enables the fabrication of a relatively very small unit, capable of producing liquid sugar in relatively small batches, consistent with demand requirements whereby liquid sugar will be continuously supplied at the desired rate. Thus, within the limits imposed by the batching operations, the production is in correspondence to and, if necessary, continuous to meet the design maximum.

The conversion operation may be completely automatic whereby the only manual operation is to maintain an adequate supply of dry sugar in the apparatus.

BRIEF DESCRIPTION OF THE DRAWINGS

In the drawings wherein like reference characters indicate like or corresponding parts:

FIG. 2 is a circuit diagram of the control circuits of the apparatus illustrated in FIG. 1.

DETAILED DESCRIPTION OF THE INVENTION

Figure 1:
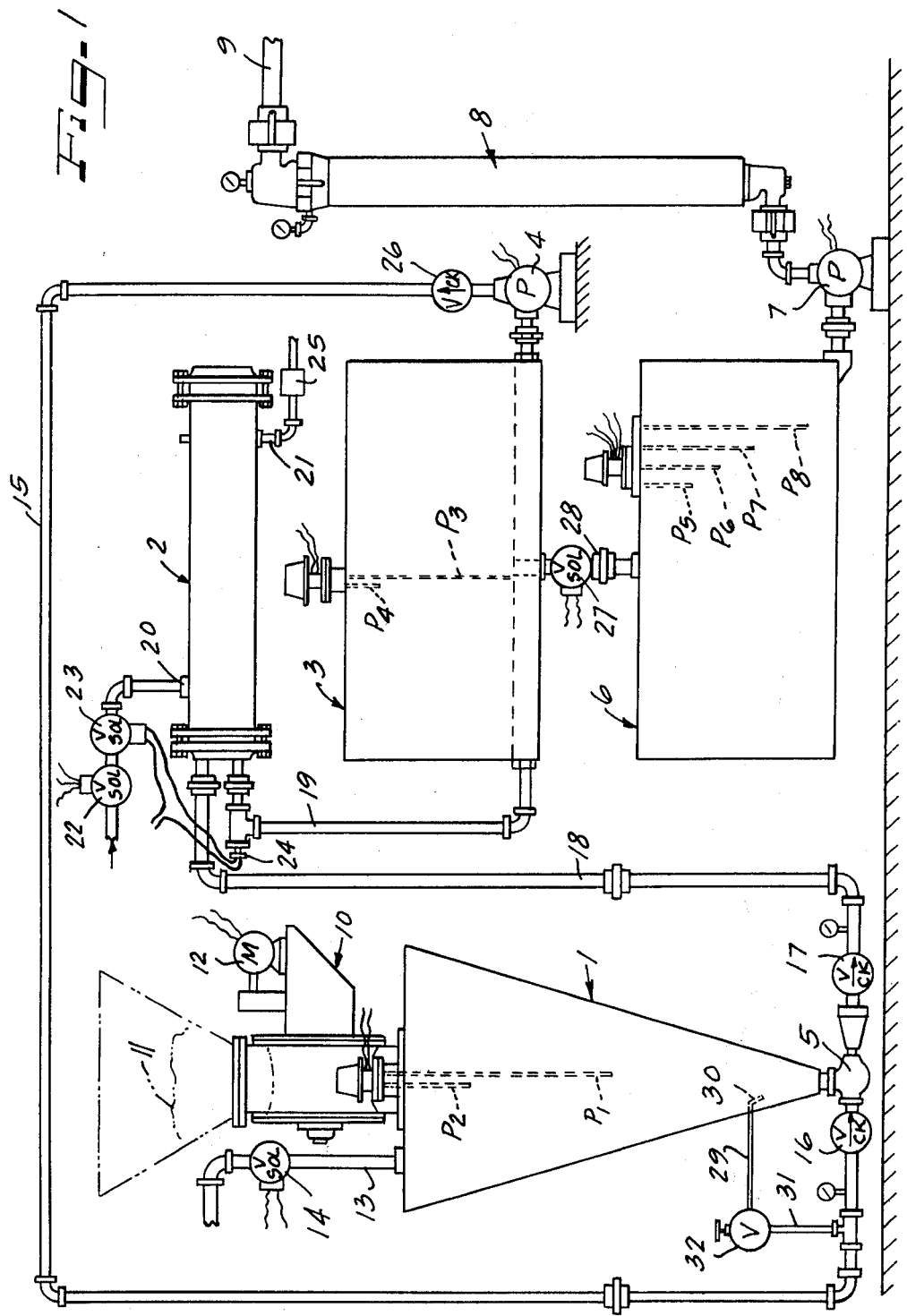
FIG. 1 is a semi-diagrammatic figure illustrating one preferred form of apparatus embodying the invention.

The invention is directed to a method and apparatus whereby, in the food industry a predetermined volume of liquid material, for example, liquid sugar may be continuously supplied within a predetermined design capacity, with the liquid material being prepared in sequential batches at a rate adequate to provide the maximum design demand.

The Method

In practicing the invention, a measured quantity of water is supplied, to which is added a predetermined quantity of dry sugar. The mixture is then heated to raise the temperature of the mixture to that required to bring all of the sugar into solution, and which, at the same time, will not result in a charring of the sugar. The liquid sugar batch so formed is retained at a storage location until subsequent transfer to a supply location from which it is ultimately withdrawn on demand. When the volume of sugar at the supply location is reduced to a predetermined minimum, additional sugar is supplied thereto from the storage location. The operating parameters with respect to the measurement of the raw materials, the magnitude of the heat supply and respective storage capacities are so determined that liquid sugar will be prepared at a rate sufficient to keep the supply location adequately supplied with liquid sugar under maximum design withdrawl.

The Apparatus

Referring to FIG. 1, the reference numeral 1 indicates a hopper structure adapted to be supplied with water and dry sugar whereby a predetermined amount of sugar may be added to a predetermined volume of water, in proportions to provide a desired sugar concentration. Following addition of the sugar to the water, the mixture is conducted from the hopper structure 1 to a heating structure 2, adapted to heat the water-sugar mixture to a temperature which will effect an instantaneous melt for any liquid-sugar concentration involved. Following passage through the heat exchanger, the liquid sugar is received in a mix tank 3. In the embodiment of the invention illustrated, transfer of the water-sugar mixture from the hopper 1 is effected hydraulically, utilizing liquid sugar in the mixing tank 3 which is circulated by means of a pump 4 through an eductor 5 operatively connected with the hopper structure 1, whereby the liquid sugar in the receiving or mix tank 3 is continuously circulated through the heater 2 until the contents of the hopper 1 are exhausted, and the tank 3 is adequately filled. The contents of the mixing tank 3 are, upon demand, supplied to a supply of use tank 6 from which they are withdrawn, for example, by a pump 7, with the liquid sugar preferably being passed through a suitable filter structure 8 prior to its discharge into the supply line or pipe 9.

The hopper 1 and tanks 3 and 6, as hereinafter described in detail, may be of a size to provide an output volume of liquid sugar at the conduit 9 consistent with the requirements of the user.

Considering the system of FIG. 1 in greater detail, disposed above the hopper 1 is a motorized valve, indicated generally by the numeral 10, adapted to control the flow of a suitable supply of dry sugar 11 into the hopper. In the embodiment illustrated, the valve 10 is a rotary type valve, adapted to be actuated by a motor 12, for example, similar to the DAY type "an" and "dn" rotary valves, manufactured by the Carter-Day Company, Minneapolis, Minnesota, the size and revolutions per minute of the valve being determined by the overall capacity of the system. The amount of sugar thus may be readily controlled by the off-on operation of the motor 12. Water is supplied to the hopper 1 through an inlet pipe 13 under control of a valve 14 which is illustrated as being a standard solenoid type valve.

The eductor 5, disposed at the bottom of the hopper 1, likewise may be of standard construction, for example, similar to the "SK type 267 solid/liquid mixing eductor", manufactured by Schutte and Koerting Company of Cornwells Heights, Pennsylvania.

As illustrated in FIG. 1, the liquid sugar is adapted to be withdrawn by the pump 4 from the lower portion of the tank 3 and conducted by piping 15 to the eductor valve 5, suitable biased check valves being disposed at opposite sides of the eductor 5 to insure retention of the materials within the hopper until desired withdrawl by eductor or operation. The output side of the eductor valve is operatively connected by piping 18 to the inlet side of the heat exchanger 2. The sugar mixture, now in the form of liquid sugar, is returned to the mix tank 3 by piping 19. The heat exchanger 2 is illustrated as having a steam inlet 20 and an outlet 21, the supply of steam, in the embodiment illustrated, being controlled by a motorized steam valve 22, which determines the overall duration of admission of steam to the exchanger, and a solenoid valve 23 adapted to be controlled by a temperature sensor 24 suitably disposed in the return line 19, whereby the temperature of the liquid sugar discharged from the heat exchanger will be continuously maintained at a uniform temperature of, for example, 180°F. Such temperature is sufficiently high to insure substantially instantaneous melting of the sugar and conversion of the water-sugar mixture to liquid sugar, while at the same time maintaining a temperature insufficient to produce a possible charring of the sugar. The return steam line 21 may be provided with the usually condensate trap 25. Likewise, a check valve 26 may be inserted in the line 15 to prevent the possibility of a reverse flow therein.

The transfer of liquid sugar from the tank 3 to the tank 6, in the embodiment of the invention illustrated, is controlled by a motorized valve 27 disposed in the connecting line 28 between the two tanks.

Likewise, in the embodiment of the invention illustrated, the control of the operating levels in the hopper 1 and tanks 3 and 6 are controlled by floatless liquid level control elements which may utilize induction or solid state relays employing probes or electrodes within the respective containers. Controls of this type may be commercially obtained, for example B/W induction relays, type LH, or solid state controls, series 51, all of which are manufactured by the B/W Controller Corporation of Birmingham, Michigan.

As hereinafter described in detail with respect to the electrical circuit, illustrated in FIG. 2, the transmission of water and sugar to the hopper 1 is adapted to be controlled by respective probes $P_1$ and $P_2$, while the level of liquid sugar in the tank 3 is adapted to be controlled by respective probes $P_3$ and $P_4$. In like manner the tank 6 is illustrated as containing four probes $P_5$–$P_8$.

The system of FIG. 1 is also provided with means for flushing the lower end of the hopper 1 adjacent the eductor 5 to prevent any possibility of clogging at the eductor, such means comprising a discharge pipe or jet 29 having its inner end 30 directed downwardly toward the eductor 5, the pipe 29 being adapted to be supplied with liquid sugar from the line 15, through a conduit 31, under control of a valve 32, illustrated as being of a manually actuatable type. The valve 32 is preferably a needle valve and is automatically controlled by operation of the pump 4, whereby such flushing operation would take place automatically during flow in the piping 15. However, in some applications it may be desirable to utilize some other flushing cycle and other control thereof.

OPERATION

In operation of the system illustrated in FIG. 1, whenever liquid sugar is required, the pump 7 is actuated under control of suitable means, such as a manual switch, to withdraw liquid sugar from the tank 6. Assuming that the tank 3 contains a completed batch of liquid sugar, when the sugar level in the tank 6 falls below the probe $P_6$, the valve 27 will be opened to admit such batch from the tank 3. If the level in the tank 6 should, for any reason, reach the probe $P_5$ the valve will again be closed. Likewise, if for any reason the level in the tank 6 should fall below the probe $P_8$, the pump 7 would be shut off. Liquid is withdrawn from the tank 3 through the open valve 27 into the tank 6. Upon the liquid level in the tank 3 falling below the end of the probe $P_3$, the valve 27 will be shut and the preparation of a new batch of liquid sugar will be initiated.

Water will then be introduced into the hopper 1 through the valve 14 and pipe 13 until the probe $P_1$ is reached at which time the water valve will be closed and the sugar valve 10 opened to supply dry sugar to the volume of water in the hopper. This, in turn, will cause the water level in the hopper to rise until the probe $P_2$ is reached, at which time the valve 10 will be closed, the pump 4 started, and the steam valve 22 opened. The water-sugar mixture in the hopper 1, will then be withdrawn therefrom through the eductor 5 by the flow of liquid from the tank 3 through the piping 15, and eductor 5 with the water-sugar mixture being conducted through the piping 18 and heater 2, from which it will be returned over the piping 19 to the tank 3. As such circulation continues, the water-sugar mixture will be transferred from the hopper 1 to the heater 2, converted into liquid sugar, and conducted into the tank 3. Throughout this operation the sensor 24 and solenoid valve 23 will so control the admission of steam to the heat exchanger 2 that the desired temperature of the liquid sugar discharged from the heat exchanger 2 will be maintained at the desired temperature. This action will continue until the liquid sugar level in the tank 3 reaches the probe $P_4$, at which time the valve 22 will close and cut off further supply of steam to the heat exchanger 2. Preferably, the operation is such that the pump 4 will continue for a predetermined period following cutoff of steam to the heat exchanger 2 to insure that the temperature in the heat exchanger will not build up to a point where the sugar might be charred.

The components of the system illustrated in FIG. 1 are so selected as to design capacity and operational parameters that within design parameters the liquid sugar may be withdrawn from the tank 6 at a maximum specified rate which will insure an adequate period from the supply of a batch thereto, to the time the liquid level falls below the probe 6, in which the prepare and supply a new batch of liquid sugar to the tank 3, so that within such design parameters the system may be continuously operated.

Thus, assuming for example, a system designed to operate at a maximum continuous demand load of five gallons per minute, the respective component may have the following specified design capacities and characteristics. As the apparatus operates on the batch system, the size of the batch and storage requirements will be dependent, at least in part on the time required to prepare the batch. In the present instance the system readily can be designed for the production of 10 gallons of liquid sugar every 2 minutes, thus meeting the specified 5 gallons per minute requirement.

The hopper 1 therefore may have a mix capacity of 10 gallons. The tanks 3 and 6 may, in such case, each have a capacity of 30 gallons, with the transfer from the mix to use tank taking place in 10 gallon quantities, leaving a residual 10 gallons in the tank 3 at all times (as determined by the standpipe 28' therein) for circulation and withdrawl of a batch from the hopper 1. In such case, the probes $P_1$ and $P_2$ will be so positioned that substantially 4.3 gallons of water and substantially 75.1 lbs. of sugar will be supplied to the hopper.

Probe $P_3$ is so positioned that it will be just above the liquid level at the standpipe 28', while the probe $P_4$ is disposed to just contact the liquid level in the tank 3 following the addition of a new batch thereto.

The tank 6 is adapted to normally contain from 15 to 25 gallons of liquid sugar, and the probe $P_6$ is therefore positioned to effect an opening of the valve 27 when the liquid level reaches 15 gallons. The probe $P_5$ functions both as a reset for the relay $B_2$ and as a safety device operative to shut the valve 27 if the liquid level should exceed the desired maximum quantity.

Probe $P_8$ merely is a low-level probe adapted to prevent further withdrawl from the use tank 6 in the event the liquid level therein abnormally falls, for any reason, below such probe, while the probe $P_7$ is adapted merely to reset the safety circuit including the probe $P_8$.

With respect to time factors, the respective components are operable to provide adequate speeds in all operations to achieve the desired results. For example, the water may be readily supplied in 15 seconds, the sugar is slightly over 9 seconds. The pump may have a capacity of 11 gallons per minute, operable in conjunction with the eductor 5 to empty the hopper 1 in 40 seconds, and the heat exchanger of a size to bring the 10 gallons of mix from a temperature of 40°F. Likewise, the motorized valve may readily have an opening speed of 2 seconds and permit emptying of the 10 gallon batch into the use tank 6 in 10 seconds. Thus, the entire operation may take place in less than 2 minutes to readily permit the design withdrawl of 5 gallons per minute.

As illustrated in FIG. 1, pressure gauges may be included at various locations, for example, at both sides of the eductor 5, and at the filter 8 to permit determination of proper operating parameters.

THE ELECTRICAL CIRCUIT

FIG. 2 illustrates details of the electrical circuit for achieving the above desired operation of the system. This figure also includes substantially all of the components illustrated in FIG. 1, some of which are illustrated in diagrammatical form and it will be noted that, to simplify the presentation, the eductor 5 is separated from the hopper 1 and connected thereto by piping, whereas the eductor is illustrated in FIG. 1 as being connected substantially to the bottom of the hopper 1. In FIG. 2, the reference numeral 33 designates a motor operated selector or sequence switch having four singlepole-doublethrow sections respectively composing contacts S1, S2, P1 and P2, respectively with the contacts being actuated in predetermined sequence by a motor indicated generally by the numeral 34 which, for example, could be of the step type.

The circuit includes three contactors or relays C1, C2 and C3 (which, for example, may be type 1300 B/W contactors) each having one or more pairs of corresponding contacts c1, c2 and c3 and six liquid-controlled relays, designated B1–B6, which for example may be introduction relays, such as those heretofore referred to. Relays of this type employ a primary winding connected directly to the power source as well as a secondary winding operatively connected to the controlling probe, and for purposes of clarity, the primary windings of such relays have been omitted, merely a secondary winding for each relay, necessary to understand the operation of the system, being illustrated in the drawing. As in the case of the contactors, the pairs of contacts of the associated relays B1–B6 will be identified by the small letter b and the associated number of the relay, i.e. b1, b5, etc. In addition, where a relay or contactor includes a plurality of sets of contacts, they will be identified by their normal condition, i.e. open ($\doteq$) or closed ($\not\doteq$)( and if necessary by their location. In addition, a time delay switch TD is provided having normally open contacts adapted to be closed when the timer is actuated and remain closed for a predetermined time following the cutting off of power thereto.

The entire circuit is adapted to be controlled by a main power switch 35, and to enable an operator to ascertain whether the apparatus is in batching, transfer or feed and supply condition, corresponding lights $L_b$ (for batch positions), $L_T$ (for transfer position) and $L_f$ (for feed and use position) are provided so that by ascertaining which lamp is illuminated, the operator may readily determine the present operating condition of the apparatus, and if necessary step the sequence by momentarily closing a switch SA.

FIG. 3 illustrates the respective positions of the sequence switch 33 for each state of operation of the apparatus.

Initial Feed and Use Condition

It will be assumed that in this condition the tanks 3 and 6 are both operatively full, in which case the sequence switch 33 will be in the feed and use positions as illustrated in FIG. 2 (and in the top position illustrated in FIG. 3). Under these conditions the following circuits will be operative:

Contactor C1 and lamp $L_f$ will be actuated over a circuit extending from power line $L_1$ over contacts $S_1$ and line $L_2$. Normally closed contacts c1 in the "close" line to the feeder valve 27 will be open while normally closed contacts c1 in the "open" line to feeder valve 27 will be closed. As probes $P_3$ and $P_4$ in the tank 3 will both be contacted by the liquid in the tank, the windings of the relays B3 and B6 will both be actuated, whereby the normally closed contacts b3 associated with the windings of relays B4 and B5 will be open, normally open contacts b3 associated with contacts $P_2$ of the sequence switch will be closed (this having no effect at this time, as it is connected with a presently open circuit), and normally closed contacts b6 associated with contacts $P_1$ of the sequence switch 33 will be open.

Likewise assuming that the tank 6 is operatively filled, all probes therein will be engaged by the liquid and windings of the relays B1 and B2 will be energized, normally open contacts b1 associated with the drawoff pump 7 being closed and normally closed contacts b2 associated with the open line to the feeder valve 27 being open. It will also be noted that as normally open contacts b1 and b2 are closed the two relays are locked in, insofar as the probes $P_5$ and $P_7$ are concerned, and actuation of the relays are thus dependent upon the engagement of the liquid with the probes $P_6$ and $P_8$.

Under such conditions, the drawoff pump 7 may be operated and the light $L_f$ will indicate this condition of the system. As liquid is withdrawn from the tank 6, the level eventually will fall below the end of the probe $P_5$, but this will have not effect due to the lock-in action of the contacts b2 and the relay will continue to be energized until the liquid level falls below the end of the probe $P_6$, at which point the relay B2 will fall, opening normally open lock-in contacts $b_2$ and closing normally closed contacts $b_2$ in the open line to feeder valve 27, whereby actuating the feeder valve in opening direction to supply liquid sugar from the tank 3 to the tank 6.

If, for any reason, the level in tank 6 should rise to the probe $P_5$, relay B2 will again be actuated, opening normally closed contacts b2 in the open line of the feeder valve 27 and closing normally open contacts b2 in the close line to the feeder valve 27. This operation will continue until the liquid level in tank 3 drops to the top of stand pipe 28' and below the end of probe $P_3$. As previously mentioned, with the falling of the liquid level below the probe $P_4$, relay B3 will fall and normally open contacts b3 will open without effect as they are not operatively connected in a closed circuit, while the closure of normally closed contacts b3 to the relays B4 and B5 will merely ready these relays for subsequent actuation.

Bathing Operations

The mix tank 3 will empty until the level therein reaches the top of the stand pipe 28' forming the inlet to the valve 27 whereby ten gallons of liquid sugar will remain the tank. However, as the liquid level has, at this point, fallen below the end of the probe $P_3$, relay B6 will fall, closing normally closed contact b6, to complete a circuit from line L1 through normally closed contacts b6 and contacts of position section $P_1$ to actuate the motor 34, and advance the sequence switch 33 to batching position, illustrated in FIG. 3.

With the sequence switch 33 in this position, a circuit is completed from line L1 over actuated contacts S1 and lamp $L_B$ to line L2, illuminating such batch-indicating lamp. At the same time, the water valve 14 is actuated over normally closed contacts B5. Water will continue to be supplied to the hopper 1 until the water level therein reaches the probe $P_1$, at which time a circuit will be completed from probe $P_1$ to one side of the winding of relay B5, the opposite side being operatively connected over normally closed contacts B3 to ground. With the energization of relay B5, normally open contacts b5 will close to lock in the relay independently of the probe 1, and normally closed contacts B5 in the line to water valve 14 will open to shut off the supply of water to the hopper. Simultaneously, normally open contacts b5 will close, closing a circuit from line L1, contacts S2, contacts b5 and normally closed contacts b4, valve 12 and line L2, whereby the valve 12 will be actuated to feed dry bulk sugar to the hopper. Such action will continue until the water-sugar mixture in the hopper reaches probe $P_2$, thereby closing a circuit from the probe to one side of the winding of relay B4, with the opposite side thereof being connected over contact b3 to ground. Upon relay B4 being energized, normally open contact b4 will lock in the relay B4 irrespective of the probe $P_2$, whereby both relays B4 and B5 are dependent upon closure of normally closed contacts b3 associated therewith. At the same time, normally closed contacts b4 in the operating line to the valve 12 will be opened, thereby operatively closing the valve and cutting off the supply of sugar to the hopper.

Transfer and Heating Operations

Also, upon actuation of the relay B4, normally open contacts b4, associated with the section $P_2$ of the sequence switch 34, will be closed thereby closing a circuit from line L1 over contacts S1 and S2, contacts b4, contacts $P_2$ and $P_1$ to actuate stepping motor 34 and advance the same to the bottom (transfer) position illustrated in FIG. 3.

With actuation of the sequence switch 33 to such third position, a circuit will be closed from line L1 over contacts S1 and S2, winding C2 and lamp $L_T$ to line L2. Upon energization of the winding C2, normally closed contacts C2 in the close line of the steam valve 22 will be opened and normally open contacts C2 in the open line will be closed, to thereby actuate the steam valve to open position. Simultaneously therewith, normally open contacts c2 in series with the time delay device TD, will close to actuate the latter thereby closing the normally open contacts td thereof in series with the relay winding C3, thereby energizing the latter and closing normally open contacts c3 in the circuit to the circulating pump 4 to actuate the latter. Liquid sugar in the mix tank 3 will begin to circulate through the lines 15 and 18 to empty the hopper 1, with the material removed from the hopper passing through the heat exchanger 2 which instantly converts any unmelted and undissolved sugar to liquid sugar, which is returned to the tank 3 over the line 18. The temperature sensing unit 24 will control the operation of the solenoid valve 23 to maintain the temperature of the liquid sugar at the outlet of the heat exchanger at a constant temperature of, for example, 180°F and thereby prevent any scorching of the sugar. As additional liquid sugar is added to the volume in the tank 3, the liquid level will quickly reach the probe P3, resulting in energization of winding of the relay B6, which merely opens the normally closed contacts b6, with no effect on the immediate operation as the line associated therewith is open at contact $P_1$.

Return to Feed Position

This action will continue until the liquid sugar level in the tank 3 reaches probe p4, at which time the winding of relay B3 will be energized. Upon energization of such relay, the normally open contacts b3 associated therewith will be closed, completing a circuit from line L1 through contacts P2 and P1 to the motor 34, actuating the same to return the sequence switch 33 to its original position illustrated in FIG. 2 and at the top of FIG. 3.

Upon return of the sequence switch to such position, a circuit will be restored from line L1 through switch contacts S1 to energize the relay C1 and illuminate lamp $L_F$. Simultaneously with the actuation of the sequence switch 33, relay C2 will be energized, resulting in opening of the normally open contact c2 in the open line to the steam valve 22 and closing of the normally closed contacts c2 in the close line of the steam valve, thereby closing the same. Likewise, the normally open contacts c2, controlling the time delay TD, will open and after a predetermined delay the contacts td will open permitting relay C3 to fall, and the normally open contact c3 in the line to the circulating pump 4 will open, thereby shutting off the pump after a predetermined delay following closing of the steam valve, to dissipate any heat build up in the heat exchanger and thereby prevent a possible scorching of the sugar.

The tank 3 thus contains a completed batch of liquid sugar ready for transfer to the tank 6, which, however, cannot occur while the relay C2 is actuated as normally closed contacts b2 in the open line of the feeder valve 27 will be open as long as the liquid level in tank 6 is in contact with the probe p6. Sugar may therefore be drawn off from the tank 6 until the liquid level falls below the probe, at which point relay B2 will de-energize, closing normally closed contacts b2 and as normally open contacts c1 in series therewith are closed as a result of the actuation of relay c1, the feeder valve 27 will be actuated to open and discharge the prepared batch in tank 3 into tank 6.

If for any reason when relay B2 is deactuated by the level falling below the probe 6, the system is still in batching operation, relay C1 will be unactuated and the feeder valve 27 will thus be maintained in closed position by the normally closed contacts c1 in the close line and the open contacts c1 in the open line.

As previously mentioned, the relay B1 and associated probes p7 and p8 in the use tank 6 function primarily as a safety device and in the event the liquid level falls below the probe 8, the relay B1 will fall opening contacts b1 in the circuit of the drawoff pump to thereby prevent any further removal of sugar from the tank 6.

To insure proper setting of the sequence switch 33, following actuation of the master on-off switch 35, as previously mentioned, switch SA, of the momentary type is provided, remains whereby each time this switch is actuated, the sequence switch will be stepped one step, the positions thereof being accurately indicated at all times by the respective indicating lamp L.

It will be appreciated from the above that the invention also may be utilized to effect a mixing of more than two components. Thus additional liquids and dry materials may be readily included in each batch operation by suitable addition thereof to the dry and/or liquid components. In such case the inclusion may be effected merely by adding previously measured quantities of the additional material to the hopper during the supply thereto of the other materials, or may be added in sequence with the other materials by an additional step, i.e. providing a further probe and/or other circuitry to make the addition in a desired sequence with respect to the other components.

An arrangement therefore is schematically illustrated in FIG. 3, wherein there is provided a suitable additional valve 14' and associated piping, by means of which such additional component or components may be supplied and suitably controlled. For example, in the illustration, the valve 14' is operatively connected to the line L2, and to line L1 over normally closed contacts b5, contacts S2 and a timer T. The timer is of a type that will complete the desired circuit upon the application of power thereto, remaining operatively closed for a predetermined time duration, at the end of which it opens the controlled circuit, remaining open until reset by the opening of its trigger circuit and thereafter actuated by the subsequent closing of the trigger circuit. Thus, the desired amount of additional material may be varied by varying the operating cycle of the timer. Likewise, the valve 14' could be directly controlled by such contacts b5, where the piping is connected to supply means adapted to supply the material in measured quantities. With this arrangement it is merely necessary that the time, as determined by the timer T be not greater than the batching time, i.e. the duration of the fill time to the probe $P_2$.

Although minor modifications might be suggested by those versed in the art, it should be understood that I wish to embody within the scope of the patent warranted hereon all such modifications as reasonably and properly come within the scope of my contribution to the art.

I claim as my invention:

1. A method for the automatic preparation, on demand, of a liquid material from dry and/or liquid component materials, comprising the steps of providing a predetermined quantity, of fixed total amount, of a first component material, adding a predetermined quantity, of fixed total amount, of a second component material to said first quantity, at least one of said component materials being in liquid form, to form a mixture of fixed total amount having a predetermined concentration, providing a previously prepared supply of such liquid material, circulating such previously prepared material through a closed path, not including said fixed total amount of said mixture of predetermined concentration, withdrawing quantities of said mixture from said fixed total amount, in amounts that are small as compared with said total amount, and introducing said small amounts of mixture so withdrawn into said closed circulating path, and applying sufficient heat to the prepared material and the component mixture, circulating in said closed path, to cause any undissolved materials therein to go completely into solution, and, following such application of heat to said fixed total amount of the added component mixture, supplying the material, so prepared therefrom, for use.

2. A method according to claim 1, wherein said prepared material is prepared in a successive series of batches of like volume, as required by the usage thereof, wherein each batch is of such quantity that it may be produced in a normal production cycle, the duration of which is not greater than the design maximum supply flow within the duration of such production cycle, whereby such production can meet a continuous flow at said design maximum.

3. A method according to claim 2, wherein said production cycle is not greater than a predetermined multiple of the maximum flow rate per unit of time and the volume of a batch produced in such cycle is at least equal to the maximum volume of flow during such predetermined multiple.

4. A method according to claim 2, wherein said first component material comprises a liquid and the second component material comprises a dry bulk material, in which the amount of liquid is determined by volume and that of the dry bulk material is determined by volume of the mixture of liquid and bulk material added thereto.

5. A method according to claim 4, wherein said liquid material is water and said bulk material is dry sugar, comprising the further step of maintaining the temperature of the applied heat at a point below that at which charring of the sugar would take place.

* * * * *